(12) United States Patent
Frangi et al.

(10) Patent No.: US 11,253,967 B2
(45) Date of Patent: Feb. 22, 2022

(54) MACHINE TOOL

(71) Applicant: SPRINGA S.r.L., Milan (IT)

(72) Inventors: Lorenzo Frangi, Barlassina (IT);
Davide Cevoli, Castel Maggiore (IT);
Alessandro Trifoni, Bologna (IT)

(73) Assignee: SPRINGA S.R.L., Milan (IT)

( * ) Notice: Subject to any disclaimer, the term of this patent is extended or adjusted under 35 U.S.C. 154(b) by 0 days.

(21) Appl. No.: 15/514,168

(22) PCT Filed: Sep. 29, 2015

(86) PCT No.: PCT/IB2015/057455
§ 371 (c)(1),
(2) Date: Mar. 24, 2017

(87) PCT Pub. No.: WO2016/051342
PCT Pub. Date: Apr. 7, 2016

(65) Prior Publication Data
US 2017/0239768 A1    Aug. 24, 2017

(30) Foreign Application Priority Data

Oct. 2, 2014    (IT) .......................... MI2014A001726

(51) Int. Cl.
*B23Q 9/00* (2006.01)
*B23Q 17/24* (2006.01)
*B62D 61/06* (2006.01)

(52) U.S. Cl.
CPC ....... *B23Q 9/0007* (2013.01); *B23Q 17/2414* (2013.01); *B62D 61/06* (2013.01); *Y10S 901/01* (2013.01); *Y10T 409/303808* (2015.01)

(58) Field of Classification Search
CPC .. B23Q 9/0007; B23Q 17/2414; B62D 61/06; B62D 61/065; B62D 61/08; Y10T 29/5107; Y10T 409/303752; Y10T 409/303808; Y10S 901/01; Y10S 901/41
USPC ........ 29/26 R; 224/401; 901/1, 41; 409/131, 409/132
See application file for complete search history.

(56) References Cited

U.S. PATENT DOCUMENTS

| 2,623,552 | A | * | 12/1952 | Compton | ............... | B27G 13/02 408/21 |
| 2,701,986 | A | * | 2/1955 | Petty | ....................... | E04F 21/28 409/181 |
| 3,346,894 | A | * | 10/1967 | Lemelson | ............... | B23B 51/08 318/162 |
| 3,421,411 | A | * | 1/1969 | Lowry | ................... | B23D 79/02 409/143 |
| 3,628,624 | A | * | 12/1971 | Wesener | .................. | B62D 1/28 180/168 |

(Continued)

FOREIGN PATENT DOCUMENTS

EP        0 314 853 A1    5/1989
EP        1 174 212 A1    1/2002

*Primary Examiner* — Erica E Cadugan
*Assistant Examiner* — Michael Vitale
(74) *Attorney, Agent, or Firm* — Vorys, Sater, Seymour and Pease LLP

(57) ABSTRACT

Provided is a machine tool configured for machining by removing material from an object defining a machining surface and including a removal tool of material from the object and driving means configured to be placed directly in contact with the machining surface and to move said machine tool and, thus, the removal tool, with respect to the object.

4 Claims, 3 Drawing Sheets

(56) References Cited

U.S. PATENT DOCUMENTS

| | | | | |
|---|---|---|---|---|
| 3,935,922 A * | 2/1976 | Cooper | ............... | A47L 11/4011 180/168 |
| 4,307,791 A * | 12/1981 | De Bruine | ............... | B62D 1/28 180/168 |
| 4,541,049 A * | 9/1985 | Ahl | ...................... | G05D 1/0231 180/168 |
| 4,556,940 A * | 12/1985 | Katoo | .................... | G05D 1/027 180/168 |
| 4,769,201 A * | 9/1988 | Chiuminatta | ........... | B24B 19/02 264/154 |
| 4,935,949 A * | 6/1990 | Fujita | .................... | A61B 6/035 378/198 |
| 5,143,490 A * | 9/1992 | Kopras | .................... | B23C 5/10 144/219 |
| 5,281,079 A * | 1/1994 | Lemelson | .............. | B23Q 41/00 29/26 A |
| 5,323,823 A * | 6/1994 | Kopras | .................... | B23C 5/10 144/219 |
| 5,468,099 A * | 11/1995 | Wheetley | ................ | B23B 39/04 180/8.1 |
| 6,056,485 A * | 5/2000 | Magill | ...................... | B23C 5/10 407/54 |
| 6,129,489 A * | 10/2000 | Linderholm | ....... | B23K 37/0217 408/76 |
| 6,633,150 B1 * | 10/2003 | Wallach | ................... | A47L 9/009 15/21.1 |
| 6,719,504 B2 * | 4/2004 | Downey | .................. | B28D 1/00 144/136.95 |
| 7,387,475 B2 * | 6/2008 | Beggs | ...................... | B23Q 9/02 408/13 |
| 8,160,762 B2 * | 4/2012 | Moriguchi | ........... | G05D 1/0227 701/22 |
| 2003/0120377 A1 | 6/2003 | Hooke et al. | | |
| 2007/0110533 A1 * | 5/2007 | Geissler | ................ | B23B 31/261 409/231 |
| 2011/0188959 A1 * | 8/2011 | Brambs | ..................... | B23C 3/00 409/132 |
| 2014/0009561 A1 * | 1/2014 | Sutherland | ............... | B25J 5/007 348/14.05 |
| 2015/0003927 A1 * | 1/2015 | Spishak | ................... | B25J 5/007 408/1 R |
| 2015/0050095 A1 * | 2/2015 | Krenzer | .................... | B23C 5/10 409/132 |

* cited by examiner

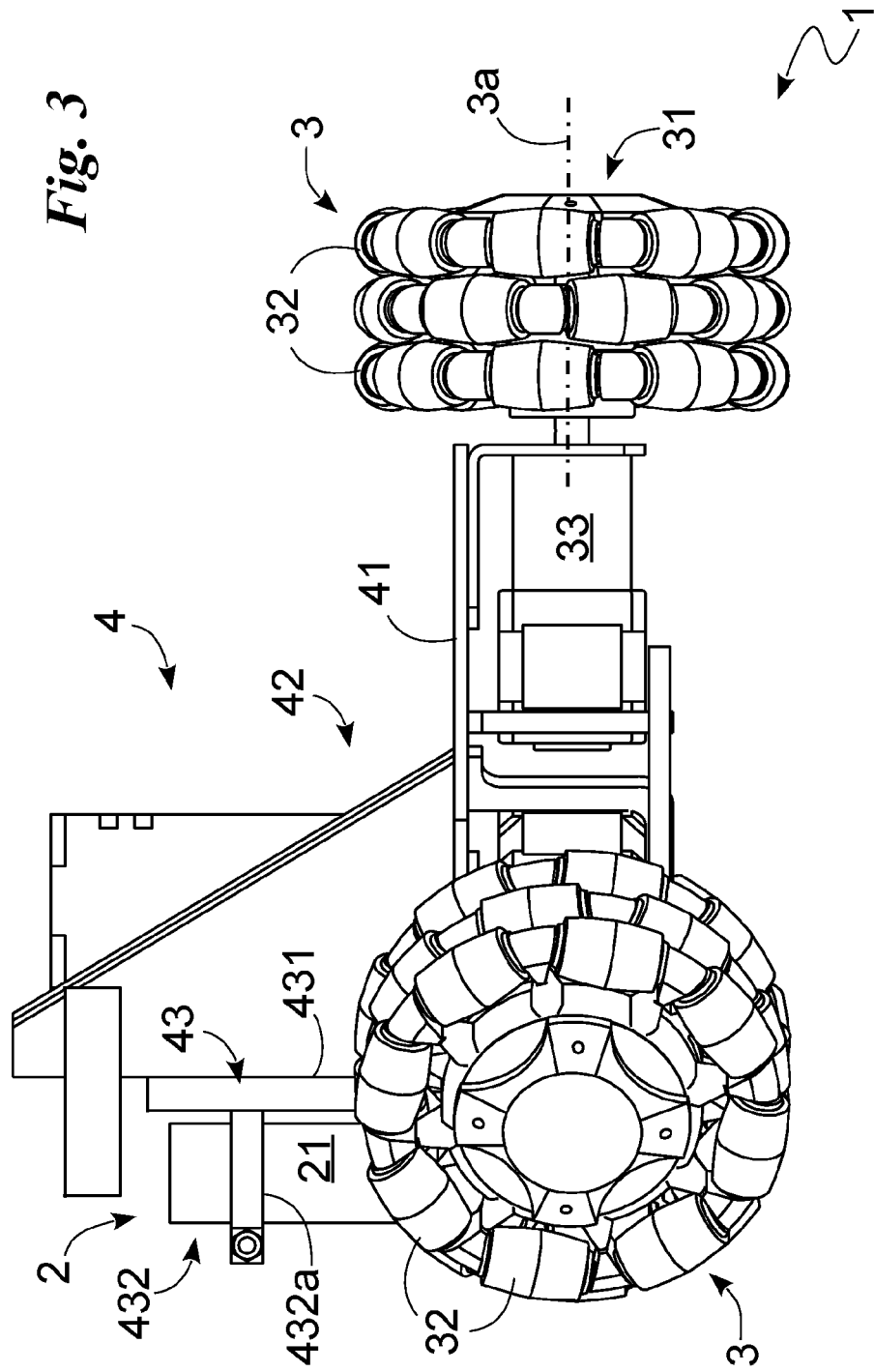

MACHINE TOOL

The present invention relates to a machine tool of the type as recited in the preamble of the first claim.

In particular, the device which the present invention relates to is a machine tool the movement of which during machining is directed by a computer which controls its movements and functions according to a clearly-defined work programme.

As known machine tools are divided, depending on the type of machining or tool, into lathes, drills, sanders, milling machines, and usually include a piece-holder table which the object to be machined is constrained to and a spindle which the tool for performing the work is joined to.

The operation of such machines requires that the operator puts the object on the piece-holder table, connects a tool to the spindle, performs the relative positioning between the spindle and tool, starts the spindle and, then moves the object to be machined and/or the spindle along a straight guide.

The prior art has several significant drawbacks.

A first disadvantage is that to make non rectilinear shapes or profiles, the movement of the tool or workpiece is performed manually by the operator who must thus have high dexterity and experience.

Another drawback is the high level of danger and, therefore, the fact that the operator may seriously injure him/herself.

This problem is further increased by the fact that the safety guard is often removed to improve the visibility of the cut or blade.

Another drawback is that the operator, to perform different types of machining, is forced to both buy several machines, increasing production costs, and to move the object between the different machines, increasing processing times.

To solve the aforementioned problems CNC machines are increasingly used which identify a base station on which to perform different processing without moving the object to work on.

CNC machines have a protective shell that contains the various components and defines a processing chamber; an interface external to the shell by means of which to define the machining to be done; a piece-loading system designed to introduce and extract the object to be processed from the chamber; several spindles on which the machining tools are mounted and tool changer systems.

The spindles are lastly fitted with a driving system which by translating or rotating the spindle in relation to the object permits the performance of a chosen machining.

These machines, although representing an improvement compared to the traditional machine tools described above, have some major drawbacks.

One important drawback is the limited size of an object worked with these machines since, having to be inserted in the processing chamber, they cannot have large dimensions.

Another drawback is that the CNC machines have a high complexity of construction and, therefore, high purchase and maintenance costs.

Another drawback is the high energy consumption of such machines, which, together with the aforesaid high purchase and maintenance costs, make the pieces produced this way particularly expensive.

Another drawback is that the CNC machines require the operator to have an advanced knowledge of the machine and of the programming language and are thus complex to programme and use.

The machine tool described in the patent application EP-A-1174212 only partially obviates such drawbacks. It can be positioned at a preferred point on the object being processed but must then be anchored to the same by means of a vacuum system which is complex and slow to activate.

In this situation the technical purpose of the present invention is to devise a machine tool able to substantially overcome the drawbacks mentioned.

Within the sphere of said technical purpose one important aim of the invention is to provide a machine tool having reduced costs of purchase, maintenance and use.

Another important aim of the invention is to make a machine tool of reduced size.

A further purpose of the invention is to develop a machine tool which can easily and securely perform any cutting profile on an object of any size.

The technical purpose and specified aims are achieved by a machine tool as claimed in the appended Claim 1.

Preferred embodiments are evident from the dependent claims.

The characteristics and advantages of the invention are clearly evident from the following detailed description of a preferred embodiment thereof, with reference to the accompanying drawings, in which:

FIG. 3 is a side view of the machine tool according to the invention.

Figure 1:
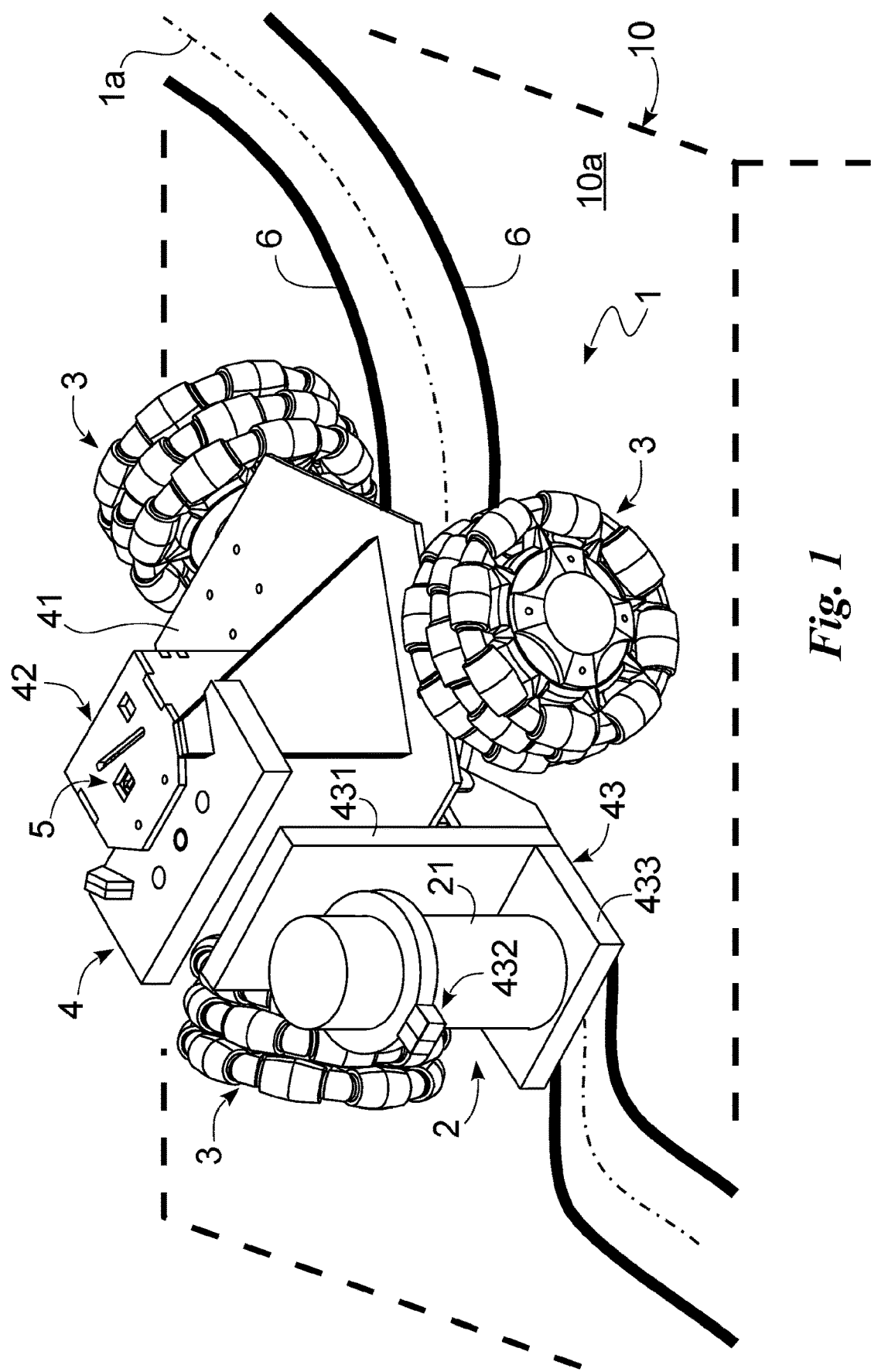
FIG. 1 shows a machine tool according to the invention in an axonometric view and during machining.
Figure 2:
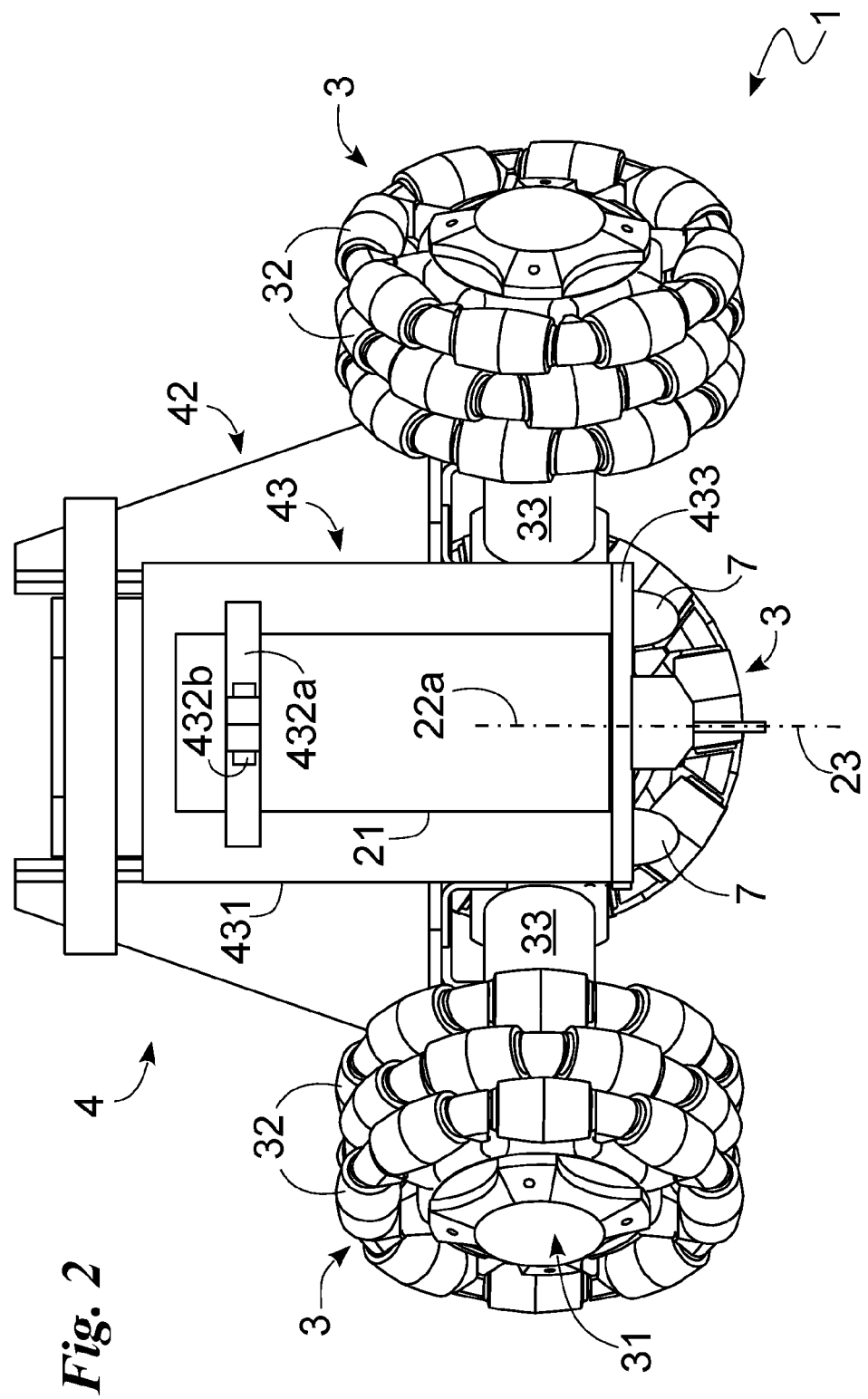
FIG. 2 shows a front view of the machine tool according to the invention.

Herein, the measures, values, shapes and geometric references (such as perpendicularity and parallelism), when used with words like "about" or other similar terms such as "approximately" or "substantially", are to be understood as except for measurement errors or inaccuracies due to production and/or manufacturing errors and, above all, except for a slight divergence from the value, measure, shape or geometric reference which it is associated with. For example, said terms, if associated with a value, preferably indicate a divergence of not more than 10% of said value.

With reference to said drawings, reference numeral 1 globally denotes the machine tool.

It is suitable to be used to remove material from a machining surface 10a, preferably substantially flat, of an object 10 to perform machining such as channels, holes, grooves and/or to cut said object. In particular, the object 10 is a sheet, preferably of wood, and the removals are excisions of the sheet. The object 10 or workpiece thus has surface dimensions generally less than 100 m$^2$. The object 10 may be made of wood, paper, cardboard, fabric or metal.

The machine tool 1 comprises at least one removal tool 2 of material from the object 10; driving means 3 suitable to be placed in direct contact with the surface 10a and to move the removal tool 2 and the machine tool 1 with respect to the object 10; a housing 4 to which the removal tool 2 and the means 3 are associated; and a power supply (a battery and/or cables to connect to an external network) suitable to power the components of the machine tool 1.

The removal tool 2 is thus a cutting and/or drilling tool suitable to remove material by melting, evaporation, or preferably, by means of chip removal. It can thus be a rotating, alternating or laser tool, waterjet or otherwise. It is preferably a small tool, namely a tool which removes material in a surface area less than dm$^2$, preferably cm$^2$.

The object 10 is thus in direct contact and supports the driving means 3 during the machining and the exchange of forces during the machining takes place directly between the object 10 and driving means 3.

It may include a stator part 21; a spindle 22, preferably an electric spindle, defining a working axis 22a; and a tool 23 suitable to be secured to the spindle 22 so as to rotate around the work axis 22a performing the removal of material.

The tool 23 may be a drill bit and thus the removal tool 2 may be a drill. Alternatively, the tool 23 may be a cutter and thus the removal tool 2 may be a milling machine.

The driving means 3 comprise drive wheels defining a main axis of rotation 3a and the machine tool 1 has a control unit 5 suitable to control at least the removal tool 2 and, thus, the removal tool and the drive wheel and, thus, the movement of the machine tool 1 along a removal path 1a along which the removal of material is performed.

It can be seen how, if fitted with a control unit, the machine tool 1 is identifiable in a numerical control machine tool.

Furthermore, since it machines an object 10, the control unit 5 does not require operators to be on board the machine tool 1, which is too small to accommodate an operator.

Preferably, the driving means 3 include a plurality of drive wheels and, more precisely, three drive wheels having main rotation axes 3a mutually almost equally angularly spaced at approximately 120°.

Each drive wheel includes a base body 31, preferably virtually cylindrical, having an extension axis almost coinciding with the axis of rotation 3a and suitable to rotate about the same axis 3a; rolling elements 32 idly hinged to the side surface of the base body 31 so as to come between the body 31 and surface 10a and, thus come into direct contact with said surface 10a; a motor 33, specifically, electric, suitable to control the rotation of the base body 31 around the axis 3a; and in some instances, an encoder suitable to monitor the motor 33.

The rolling elements 32 hinged to the base body 31 are placed along at least one circumference almost concentric with the axis of rotation 3a and with idle axes of rotation lying on a substantially transverse plane and, in particular, virtually perpendicular, to the main axis of rotation 3a. Preferably, the elements 32 are placed on a plurality of circumferences (specifically three) of equal radius, and, between adjacent circumferences, mutually angularly offset so as to always have a correct contact between rolling elements 32 and the machining surface 10a.

The rolling elements 32 are rollers and, to be precise, tapered or barrel rollers. Preferably, the drive wheels 3 are so-called "omni wheels", in themselves known. The housing 4 is suitable to support the various components of the machine tool 1. It comprises a base plate 41 suitable to be set proximal and parallel to the surface 10a and to which the control unit 5 and driving means 3 are associated; a casing 42 associated to the base plate 41 defining a volume for housing at least the unit 5; and an attachment 43 suitable to constrain the removal tool 2 to the housing 4 by placing the working axis 22a suitably virtually perpendicular to the machining surface 10a when the machine tool 1 is working. In some cases, the housing 4 may have handles, protruding from the base plate 41 and/or from the casing 42 from the opposite side to the surface and suitable to allow an operator to operate manually.

The base plate 41 may have dimensions substantially less than 0.5 m and, to be precise, less than 0.3 m, while the casing 42 may have a height, measured perpendicularly to the base plate 41, substantially less than 0.3 m, to be precise, less than 0.2 m.

The attachment 43 comprises a vertical plate 431 suitable to be set virtually perpendicular to the surface 10a; at least one coupling 432 suitable to constrain the stator part 21 to the vertical plate 431 and a horizontal plate 433 suitable to be set almost parallel to the surface 10a and on which the stator part 22a rests and having a through hole 43d at least equal to the cross-section of the spindle 22 so that it and the tool 24 protrude from the horizontal plate 433 facing the object 10. The coupling 432 is suitably of the clamp type and may provide two contrasting elements 432a, for example, substantially C-shaped, suitable to be placed on the opposite side with respect to the stator part 21 and a clamp 432b, for example a bolt, by means of which to tighten the contrast elements 432a to the stator part 21.

In some cases, the machine tool 1 may provide movers between the attachment 43 and the rest of the housing 4 suitable to move the attachment 43 and the removal tool 2 with respect to the rest of the housing 4 and thus with respect to the machining surface 10a.

The movers, not illustrated in the drawing, may provide a vertical mover suitable to vary the distance of the removal tool 2 from the surface 10a by means of a translation, preferably substantially parallel to the work axis 22a; and/or a rotational mover suitable to rotate the remover 2 around an axis substantially parallel to the machining surface 10a and virtually perpendicular to the work axis 22a by varying the angle between the working axis 22a and surface 10a.

The control unit 5 is suitable to control, independently of each other, the drive wheels 4 along the removal path.

It is also suitable to define the removal commanding the movers, and the removal tool 2 and, in particular, the spindle 22 as a function of the removal parameters. The control unit 5 includes a control circuit connected to the removal tool 2 and to the drive wheels and provided with a memory and interface means, such as a USB port, by means of which the operator can enter and store in said memory the removal parameters and, in some cases, the path 1a.

It is to be noted that in the memory there is a database associating with any type of advancement (straight, arched, elliptical, etc.), a speed and a direction of rotation for each drive wheel around its main axis of rotation 3a.

The control unit 5 preferably consists of a microcomputer, suitably a microcomputer of the Arduino® or Raspberry® type.

In some cases, the machine tool 1 comprises markers 6 suitable to be placed on the surface 10a and define the removal path 1a and sensors 7 suitable to detect the presence of the markers 6, movable by the means 3 and connected to the unit 5 which is thus able to move the machine tool 1 as a function of the signs left by the markers 6.

Preferably the markers 6 are of the optical type and may comprise one or more coloured strips, preferably two, placed on opposite sides to the removal path, to be applied on the machining surface 10a virtually parallel to the path.

The sensors 7 may be optical and, thus comprises one or more cameras, preferably two, placed on the side opposite the removal tool 2, suitable to detect the markers 6 placed on the surface 10a.

Alternatively to the markers 6 and sensors 7, the removal path 1a is defined by a programmer external to the machine tool 1, and thus transferable to the unit 5 through the interface means of said unit which thus controls the advancement as a function of the single path thus stored.

In a further alternative, the machine tool 1 may provide that the removal path 1a is defined by means of a programmer external to the machine tool 1, transferred via the interface means to the control unit 5 which controls advancement as a function of the path implemented and uses the markers 6 and sensors 7 to verify the correct advancement.

The functioning of a machine tool 1, described above in a structural sense, is as follows.

This operation introduces an innovative manufacturing process for removal suitable to be implemented by the above-described machine tool 1.

The process comprises a step of preparing the machine tool 1; a step of laying in which the machine tool 1 is rested on said machining surface 10a; and a removal step in which the driving means 3 move the machine tool 1 along the removal path 1a and in which the removal tool 2 removes material from the object 10 along the path 1a.

In the preparation phase the removal path 1a is defined and the processing parameters (such as, for example, tool rotation speed, speed of advancement) are fed into the control unit 5 and, in detail, to the control circuit.

The definition of the path 1a is executable by arranging the markers 6 on the machining surface 10a so as to form at least one strip parallel to the path 1a or, preferably, two narrow strips on opposite sides of the path 1a and almost parallel to each other and to the path 1a. In addition or alternatively, the path 1a is defined on a programmer external to the machine tool 1 and transferred through the interface means to the memory of the control unit 5.

The preparation phase is completed by connecting the removal tool 2 to the housing 4. In particular, the operator adjusts the distance of the spindle 22 from the machining surface 10a by setting the depth of cut, and using the coupling 432 locks the removal tool 2 in the desired position.

The machine tool 1 is then ready to perform the machining.

The laying step begins in which the machine tool 1 is rested on the surface 10a and the removal step in which the driving means 3 move the machine tool 1 along the removal path 1a while virtually simultaneously the removal tool 2 removes material from the object 10 along the path 1a, performing the machining.

In detail, during the removal step, the unit 5, depending on the movement database and on the signal of the sensors 7 and/or path 1a stored in the memory, enables/disables the drive wheels varying the advancement of the machine tool 1 in a manner concordant with the path 1a.

For example, if the removal path 1a provides for a straight portion virtually parallel to one of the main axes of rotation 3a, the unit 5 controls the stopping of the wheel with its axis parallel to said direction and a concordant rotation and of the same modulus as the remaining wheels; while if the path provides for an arched portion, the control unit 5 commands a discordant rotation and of the same modulus of two wheels, leaving the third immobile.

Once the removing step is completed, the machining process can end or, alternatively, provide for an additional material removal phase in which the driving means 3 move the machine tool 1 at least one additional time along said material removal path 1a and the removal tool 2 removes material from the object 10 again along the path 1a increasing the thickness of the removed material and preferably, cutting the object 10.

It must be stressed lastly that, during the removal step or additional removal step, the movement of the machine tool 1 can be performed manually by the operator thanks to the handles.

The invention achieves important advantages.

A first important advantage of the machine tool 1 with respect to those known up to now is to be identified in that it is able to perform a machining operation on any size of surface. In fact, being positioned on the object 10 and able to move without restrictions along the entire machining surface 10a, it is capable of working substantially unlimited surfaces. Such a possibility is denied in known machines where the machining stroke is limited by the stroke of the piece-holder table and/or the spindle.

Another advantage is the reduced overall size of the machine tool 1, which, therefore, constitutes an innovative small tool, portable and utilisable anywhere, to realize large-sized items.

A different advantage is that, in contrast to the known machine tools, the use of the machine tool 1 is extremely safe.

In fact, even in case of manual movement, the arrangement of the tool 23 makes it possible to conceal and make access to the cutting area difficult.

Another advantage is that the machine tool 1, following a stored removal path 1a or the markers 6, is able to perform a very precise and accurate machining.

A further advantage is that, it being possible to perform multiple passages along exactly the same path 1a, it is also possible to perform cutting operations.

An important advantage, especially with respect to the known machines with numerical control, is identifiable in that the machine tool 1 is also usable by an operator with no specific knowledge.

Another advantage is given by the presence of the movers which, by translating and rotating the removal tool 2 with respect to the machining surface 10a, make it possible to vary, even during the same passage, the depth of removal of material and the inclination of the slot with respect to the surface 10a.

Another advantage of no less importance is the constructional simplicity of the machine tool 1, making for a reduced purchase price and maintenance costs. Variations may be made to the invention without departing from the scope of the inventive concept described in the independent claims and in the relative technical equivalents. In said sphere all the details may be replaced with equivalent elements and the materials, shapes and dimensions may be as desired.

The invention claimed is:

1. A material removal machining process configured to be implemented by a machine tool for machining by removing material from an object comprising a machining surface,
    said machine tool comprising:
    a removal tool for removing material from said object, the removal tool being a milling tool, wherein the removal tool includes a stator part, a spindle defining a machining axis, and a tool configured to be attached to the spindle so as to rotate about the machining axis to perform the removing of the material during milling along a continuous material removal path;
    driving means configured to be placed directly in contact with said machining surface and to move said machine tool and, thus, said removal tool, with respect to said object along the continuous material removal path, as said removal tool removes material from said object by the rotating and milling along the continuous material removal path, said driving means comprising driving wheels, each one, defining a respective main axis of rotation,
    a control unit configured to control said driving wheels and, thus, said machine tool along the continuous material removal path, each of said driving wheels comprising a base member configured to rotate about said respective main axis of rotation and rolling members hinged to a side surface of said base member so as to be configured to arrange themselves between said base member and said machining surface and so come directly into contact with said machining surface, each of said driving wheels being rotatable independently in respect of said other driving wheels, and enabled to rotate and disabled to rotate independently, so as to allow said machine tool to move along the machining surface that may be unlimited in size and to allow said removal tool to remove material along the continuous material removal path in any direction, by the rotating and milling as the machine tool moves along the continuous material removal path, without resting in a stop position to rotate the machine tool;

wherein said material removal machining process comprises:

an application phase in which said machine tool is arranged on said machining surface; and a material removal phase in which said driving means move said machine tool along the continuous material removal path while said removal tool removes material from the continuous object along the continuous material removal path, and wherein the removal tool rotates and mills to remove the material from the object along the continuous material removal path as the machine tool moves along the continuous material removal path, an additional material removal phase in which said driving means move said machine tool at least one additional time along a same portion of said continuous material removal path, wherein while said machine tool moves the additional time along the same portion of said continuous material removal path said removal tool removes material from said object again along said continuous material removal path so as to increase the thickness of the removed material and to cut said object, wherein control of movement of said machine tool along the continuous material removal path, consists of control by the control unit configured to control said driving wheels and using sensors to verify correct advancement along the path, wherein the control unit consists of a control circuit connected to the removal tool and to the driving wheels, the control circuit consisting of a microcomputer provided with an interface and memory for storing removal parameters and the continuous material removal path, said control unit for independently enabling and disabling said driving wheels for varying advancement of the machine tool along the continuous material removal path, wherein the continuous material removal path is defined by a programmer external to the machine tool and transferred via the interface to the control unit which controls advancement of the machine tool along the continuous material removal path as a function of the continuous material removal path implemented, and wherein all of said sensors to verify correct advancement along the continuous material removal path consist of optical sensors.

2. The material removal machining process as claimed in claim 1, wherein there are three driving wheels angularly spaced at approximately 120°.

3. The material removal machining process as claimed in claim 2, wherein the control unit comprises a control circuit connected to the removal tool and to the driving wheels, and memory for storing removal parameters and the continuous material removal path, said control unit for independently enabling and disabling said driving wheels for varying advancement of the machine tool along the continuous material removal path.

4. The material removal machining process as claimed in claim 3, said control unit for controlling the driving means such that, if the continuous material removal path provides for a straight portion parallel to one of the main axes of rotation of one of said driving wheels, the control unit controls stopping of the one of said driving wheels having its axis parallel to the straight portion and an equal rotation of a same modulus of the remaining driving wheels, while if the continuous material removal path has an arched portion, the control unit commands an unequal rotation of the remaining driving wheels and leaves immobile the other one of said driving wheels.

* * * * *